United States Patent Office 3,215,634
Patented Nov. 2, 1965

3,215,634
METHOD FOR STABILIZING VISCOUS LIQUIDS
Richard E. Walker, Tulsa, Okla., assignor to Jersey Production Research Company, a corporation of Delaware
No Drawing. Filed Oct. 16, 1962, Ser. No. 231,030
16 Claims. (Cl. 252—311)

The present invention relates to viscous liquids prepared by cross-linking water-soluble polymers in aqueous solution and is particularly concerned with a method for reducing the temperature sensitivity of polymer solutions containing borate ion cross-linking agents.

Studies of the physical properties and flow behavior of liquids have shown that many liquids possess a certain amount of elasticity and tensile strength and can therefore be classified as viscoelastic materials. In most cases the elasticity and tensile strength are so low that the viscoelastic properties can be ignored for all practical purposes. Certain liquids, however, are characterized by pronounced elasticity and high tensile strength and as a result show unique characteristics during laminar flow. These liquids are referred to as "superelastic" liquids. One characteristic of such liquids is a tendency to "recoil" when deforming forces acting on them are suddenly removed and the potential energy stored in the liquids as a result of the deforming forces is converted into kinetic energy. The release of this kinetic energy may in some cases actually result in an apparent reversal of flow. Another unique characteristic is the ability of such liquids to build up resistance to deformation as shear stresses increase and to flow readily at shear stresses above certain values. Still another characteristic is the tendency to deposit entrained solids under certain conditions and thus block off large channels through which the liquids would normally flow. It has been found that these and other properties make such liquids particularly useful for controlling lost circulation in oil field drilling operations and in related applications.

The superelastic liquids which are most useful at present are prepared by cross-linking water-soluble polymers in aqueous solution. It has been found that certain polysaccharides containing adjacent cis hydroxyl groups can readily be cross-linked in aqueous solution to produce viscous liquids which are highly elastic and have considerable tensile strength. The stability of such solutions depends in part upon temperature. Tests have shown that solutions which behave as superelastic liquids frequently lose their elasticity and tensile strength, particularly if the temperature is increased. This seriously restricts the use of such liquids in operations where the temperature may vary over a considerable range.

The present invention provides a method for mitigating difficulties encountered in the past due to the instability and temperature sensitivity of liquids prepared by cross-linking water soluble polymers in aqueous solution. In accordance with the invention, it has now been found that the use of a polyhydric alcohol and a cross-linking agent which yields borate ions in solution stabilizes such solutions and reduces their sensitivity to temperature changes. This in turn makes possible use of the liquids in applications for which they would otherwise be unsuitable.

The reasons for the greater stability and reduced temperature sensitivity obtained by employing a polyhydric alcohol and a cross-linking agent which will yield borate ions in solution are not fully understood. It is believed, however, that the high elasticity and tensile strength exhibited by such liquids are due to the existence of cross-linking bonds between the polymer molecules. If insufficient cross-linking takes places, the liquid does not develop superelastic properties and instead behaves as an ordinary viscous solution. If excessive cross-linking occurs, the polymer may be precipitated. The amount of cross-linking required depends on the temperature. The use of a polyhydric alcohol and a cross-linking agent which yields borate ions provides units which are not readily available for cross-linking purposes at low temperature but become available at higher temperatures. This permits an increase in the number of cross-linking bonds between the polymer molecule as the temperature increases and thus makes possible the retention of superelastic properties over a wider temperature range. It also apparently provides a reservoir of cross-linking material which becomes available as needed to maintain the cross-linked structure. Other phenomena may be involved.

The water-soluble polymers utilized in carrying out the invention are high molecular weight polysaccharides having adjacent cis hydroxyl groups attached to one or more of the monosaccharide units in the polymer structure. Polysaccharides containing such groups, unlike those in which adjacent hydroxyl groups occupy the trans position, readily undergo cross-linking reactions with compounds which yield borate ions in solution. Monosaccharide units having adjacent cis hydroxyl groups include D-mannose, D-mannuronic acid and D-mannopyranose. Polysaccharides containing such units may be homopolysaccharides or heteropolysaccharides. Typical homopolysaccharides include 1,4'-D-mannose, linear polysaccharides such as ivory nut mannan, wood mannan and salep mannan; 1,4'-D-mannuronic acid linear polysaccharides such as alginic acid; 1,2',1,3' and 1,6'-D-mannose branched chain polysaccharides such as yeast mannan; 1,4'-D-mannose branched chain polysaccharides such as the mannan of *Porophyra umbilicalis*; and other D-mannose polysaccharides such as mannocarolose. Heteropolysaccharides containing adjacent cis hydroxyl groups include glucomannans such as those obtained from *Amorphophallus* and *Alloe vera*; galactomannans such as those obtained from the endosperm of the honey locust, flame tree, guar plant, Kentucky coffee bean, palo verde, locust bean, tara plant, lucerne, huizache plant and *Sophora japonica*; D-arabinose and D-mannose polysaccharides; D-glucose, D-mannose and D-galactose polysaccharides; and D-galactose, D-mannose and N-acetyl-D-glucoseamine polysaccharides. It will be understood that all of the above-named materials are not equally effective for purposes of the invention and that certain of these materials will therefore be preferred over others.

Preferred polysaccharides having adjacent cis hydroxyl groups for purposes of the invention include the galactomannans. Upon hydrolysis, these materials yield the two simple sugars, mannose and galactose. Analyses have indicated that such polysaccharides are long chain polymers of D-mannopyranose units linked at the $\beta$-1,4 position which have D-galactopyranose units located as side chains on the molecule. The D-galactopyranose units are connected to the $C_6$ atoms of the D-mannose units that make up the main structural framework. The ratio of D-galactose to D-mannose in the galactomannans generally varies from about 1:1.2 to about 1:2, depending upon the particular vegetable source from which the material is derived. In all cases, however, the mannose residues have cis hydroxyl groups at the $C_2$ and $C_3$ positions, accounting for the cross-linking reactions obtained with the galactomannans and making them useful for the purposes of the invention. Guar gum is a particularly preferred galactomannan.

Certain of the polysaacharides made up of monosaccharide units containing adjacent cis hydroxyl groups, 1,4' mannuronic acid polysaacharides such as alginic acid for example, are not readily soluble in water and are therefore generally employed in the form of their water-soluble salts. Sodium alginate is marketed commercially in the form of a crude material derived from algae and as a refined product for use in the food, pharmaceutical and textile industries. Ammonium alginate and other water-soluble salts are also available from commercial sources and may be utilized for purposes for the invention. In lieu of employing a water-soluble salt obtained from commercial sources, alginic acid and sodium hydroxide or a similar base can be reacted in the presence of water to form the desired water-soluble material.

The compounds which are used to cross-link the water-soluble polysaccharides and thus produce superelastic liquids in accordance with the invention are water-soluble compounds which in solution yield borate ions. Suitable borate cross-linking agents include boric acid, calcium metaborate, sodium metaborate, potassium metaborate, potassium tetraborate, sodium tetraborate, sodium metaborate tetrahydrate, sodium tetraborate tetrahydrate, sodium tetraborate decahydrate and the like. Sodium tetraborate decahydrate is marketed commercially as borax. Boric acid is preferred for purposes of the invention because of its ready availability, its low cost, and its effectiveness in very low concentrations.

The polyhydric alcohols useful for purposes of the invention are acyclic compounds containing from 2 to about 5 carbon atoms per molecule and having at least 2 adajacent hydroxyl groups per molecule. Suitable alcohols include ethylene glycol, propylene glycol, glycerol, 1,2-butylene glycol, 2,3-butylene glycol and the like. Also suitable for purposes of the invention are the water-soluble substituted polyalcohols containing at least two adjacent hydroxyl groups. Examples of compounds of this latter type include glycerol monoamine, glycerol mono-isoamyl ether, glycerol mono-n-butyl ether, glycerol monochlorohydrin, glycerol monoiodohydrin, and the like, Certain of these alcohols are more effective than others. Glycerol and ethylene glycol are preferred alcohols for use in accordance with the invention because of their relatively low cost and ready availability.

In preparing supereleastic liquids, utilizing the materials described above, a colloidal solution of the polysaccharide to be employed is normally formed first. Polysaccharides containing monosaccharide units having adjacent cis hydroxyl groups generally hydrate quickly in water to form viscous colloidal solutions. The viscosity obtained depends upon the hydration period, the temperature of the solution, the polysaccharide concentration, the pH, the ionic strength of the solution and the type of agitation employed. By varying the hydration conditions, it is thus possible to obtain colloidal solution which vary widely in viscosity. For most applications of the superelastic liquids, it is generally preferred to employ polysaccharide solutions having relatively high viscosities. A hydration period of about 5 minutes to about 2 hours is usually preferable. The galactomannans and similar polysaccharides are compatible with sodium chloride and related salts over a wide range of concentrations and hence brines can be used in place of ordinary water for preparing the aqueous colloidal solutions.

Suitable aqueous colloidal solutions can normally be prepared by simply sifting the dry polysaccharide into an agitated tank of water or brine. Agitation should be continued until the solution becomes viscous. Thereafter, the solution may be permitted to hydrate and thicken for a period of about 5 minutes to about 2 hours, depending upon the polysaccharide utilized. In most cases complete hydration is not required. A small amount of sodium hydroxide may be added to the water or brine to increase the pH and accelerate hydration if desired. About 0.05 pound of caustic per barrel of water is generally satisfactory. Other basic materials in correspondingly larger or smaller amounts can also be used. The inclusion of a bactericidal or bacteriostatic preservative in the colloidal solution is sometimes also desirable, particularly if the solution is to stand for an extended period before it is to be used. Such preservatives prevent fermentation and enzymatic hydrolysis reactions which cause the solutions to lose their viscosity. A variety of organic preservatives may be employed. Suitable materials include formaldehyde, chlorinated phenolic compounds, phenyl mercuric acetate, benzoic acid and sorbic acid. The amount of preservative employed will depend on the particular agent used.

In preparing the aqueous colloidal solutions, the polysaccharides may be employed in concentrations ranging from about 0.5 to about 12 lbs. per barrel of water. The exact concentrations employed will depend upon the particular polysaccharide selected. Guar gum concentrations between about 1.0 and about 3.0 pounds per barrel of water have generally been found most effective for producing superelastic liquids useful in oil field drilling operations. Sodium alginate concentrations of from about 8 to about 10 lbs. per barrel of water may be employed in preparing liquids to be used in such operations. Other polysaccharides can be used at intermediate concentrations. Forty-two gallon barrels are normally employed in the petroleum industry and hence the concentrations given are expressed in barrels of this size.

Superelastic liquids containing the polysaccharides may be produced by adding the borate cross-linking agents and polyhydric alcohols to the colloidal polysaccharide solutions. The concentration in which the cross-linking agent is employed will again depend upon the polysaccharide utilized. The concentrations required at room temperature generally range from about 0.01 to about 12 lbs. per barrel of colloidal solution. In the case of guar gum, the use of from about 0.05 to about 0.4 lbs. of a borate ion cross-linking agent per barrel of guar gum solution normally results in a satisfactory liquid at room temperature. Concentrations at the upper end of the 0.01 to 12.0 lbs. per barrel range are more suitable for cross-linking sodium alginate and certain of the other polysaccharides at room temperature. Somewhat higher concentrations may be employed if the liquid is to be used at higher temperatures. The concentration in which the alcohol is used will also depend upon the temperature conditions. In most cases, from about 0.1 to about 2.0 gallons of the polyhydric alcohol per barrel of colloidal solution will be employed. For guar gum solutions, about 0.06 to about 0.8 lbs. of cross-linking agent and from about 0.1 to about 1.0 gallon of polyhydric alcohol are preferred. The polyhydric alcohol stabilizes the solution at low temperature and prevents the formation of a precipitate due to the presence of excess cross-linking agent. At the same time, it makes the cross-linking agent available as the temperature of the liquid is increased and additional cross-linking becomes necessary to preserve the superelastic properties.

The cross-linking reaction may be carried out in one of several different ways. One procedure is to inject the cross-linking agent and alcohol into the colloidal polysaccharide solution as the latter is pumped from the tank in which it was prepared initially into a second vessel in which the superelastic liquid is to be used or stored. Another procedure is to add the cross-linking agent and alcohol to the colloidal polysaccharide solution and then effect cross-linking by raising the pH with caustic or a basic buffer. The cross-linking agents may be predissolved in a small amount of water before they are added to the polysaccharide solution or may instead be added as a slurry in water or oil. The temperature may be increased to reduce the amount of water required if a solution containing the cross-linking agents is utilized. Regardless of the particular system employed, cross-linking of the polysaccharide molecules generally occurs rapidly.

In lieu of first preparing a colloidal polysaccharide solution and later incorporating a cross-linking agent and a polyhydric alcohol into it to produce the desired superelastic liquid as described above, the liquid may be prepared by adding previously mixed dry materials to water and then raising the pH. Experience has shown that this latter procedure generally simplifies the preparation of superelastic liquids under field conditions and often assures more satisfactory superelastic properties. The dry materials employed will generally consist of a mixture containing (a) the polysaccharide, (b) a cross-linking agent, (c) an acid to provide the pH required for hydration of the polysaccharide and (d) a water-soluble solid polyhydric alcohol in one container and a buffer designed to raise the pH to the level necessary for cross-linking in a second container. The amount of each material present in the mixture will depend primarily upon the particular polysaccharide, cross-linking agent, acid, and polyhydric alcohol employed.

A typical dry mixture containing guar gum will include sufficient gum to produce a 150 to 300 centipoise solution when dissolved in a prescribed quantity of water. The viscosity values given are based upon measurements made at 75° F. with a Brookfield L.V.T. viscometer, using the number 1 spindle at 12 revolutions per minute. If the dry mixture is compounded to permit the preparation of 10 barrels of the superelastic liquid for example, from about 10 to about 30 pounds of dry guar gum, from about 0.8 to about 8 lbs. of boric acid or a similar cross-linking agent, from about 1 to about 4 lbs. of glycerol monoiodohydrin or a similar soluble solid polyhydric alcohol, and a small amount of benzoic acid, salicylic acid, or the like sufficient to lower the pH below about 7 and permit hydration of the guar gum may be used. It will be apparent that other acids may be employed in conjunction with the polysaccharides, cross-linking agents and polyhydric alcohol to control the pH and that the amount of acid utilized will depend upon the particular acid selected. Similar formulations utilizing other polysaccharides, cross-linking agents and alcohols may be prepared. The buffer to be used with the dry mixture in preparing a superelastic liquid as described above will include a basic material designed to provide the pH required for cross-linking after hydration of the polysaccharide has taken place. The most effective final pH depends somewhat on the polysaccharide used and cross-linking agent employed and upon the temperature conditions under which the superelastic liquid is to be used. In the case of guar gum, for example, a final pH of about 9.0 to about 9.5 is generally satisfactory at room temperature; whereas a pH of between 9.5 and about 10.0 may be more advantageous at somewhat higher temperatures, 125° F. for example. Suitable buffers include mixtures of sodium carbonate and sodium bicarbonate, triethyleneamine, mixtures of phenol with caustic or line, tetrasodiumpyrophosphate or mixtures of phosphates, mixtures of magnesium hydroxide and magnesium chloride, and the like. From about 5 to about 40 lbs. of buffer will generally suffice for the preparation of a 10 barrel batch of superelastic liquid. Again the quantity needed will depend to some extent upon the particular material selected, the final pH required by the polysaccharide and cross-linking agent utilized, the temperature conditions, and the use for which the superelastic liquid is intended. Simple tests using various buffers at different concentrations can readily be carried out to determine the most effective formulation for the preparation of superelastic liquids under particular conditions.

The nature and objects of the invention can be further illustrated by considering the results of tests carried out with superelastic liquids produced by the reaction of polysaccharides with cross-linking agents in the presence of a polyhydric alcohol and similar tests of superelastic liquids prepared without the polyhydric alcohol.

In the first of these tests, a superelastic liquid was prepared with boric acid and an aqueous solution of guar gum. The guar gum employed was a commercial guar flour having a 77% galactomannan content. This material was added to water in a concentration of 2.4 lbs. per barrel and was allowed to hydrate until a viscosity of 250 centipoises at 80° F. had been obtained. The viscosity was measured by means of a Brookfield L.V.T. viscometer operated at 12 revolutions per minute with the number 1 spindle. Boric acid was then stirred into the colloidal guar gum solution in a concentration of 0.065 lb. per barrel and the pH was adjusted to 9.3 with caustic. The resulting solution exhibited all of the properties normally characteristic of superelastic liquids.

In order to provide a measure of the superelastic properties of the guar gum solution prepared as described above, the elastic drag coefficient at 85° F. was determined. The elastic drag of a superelastic liquid may be defined as the drag force in excess of viscous drag which is exerted by the liquid on a body moved within it at constant velocity. The elastic drag coefficient is the rate of change in the elastic drag force as the body is moved in the liquid and can be determined by plotting the force required to move a body through the liquid against the distance the body moves and taking the slope of the resultant curve.

Nonelastic liquids do not exhibit elastic drag and hence only viscous drag is exerted on bodies moved within such liquids. The drag coefficients obtained with such liquids are therefore always either zero or negative, never positive. Where the coefficient is negative, the magnitude will depend upon the viscosity of the liquid, the gel strength of the liquid, the velocity at which the body is moved through the liquid and the dimensions of the body and the container within which the liquid is held.

Superelastic liquids differ from nonelastic liquids in that they give positive elastic drag coefficients rather than zero or negative coefficients. The apparent reason for this is that the movement of a body through a superelastic liquid results in a build-up in the resistance offered by the liquid to movement of the body. This build-up continues until a point is reached at which the drag on the moving body exceeds the tensile strength of the superelastic liquid. This point is generally referred to as the rupture point. When rupture occurs, the elastic forces acting on the moving body are eliminated. The total force required to move the body through the liquid therefore decreases until only sufficient force to overcome the viscous drag on the body must be applied. Under the proper test conditions, elastic forces will again be exerted on the body as it is moved through the liquid after the initial rupture point has been reached. The force required to move the body through the liquid will therefore again increase until a second rupture point is reached. A plot of the force required to move the body versus the distance through which the body moves will thus show a positive drag coefficient during one or more intervals as the body is moved. This behavior is characteristic of superelastic liquids and provides a convenient method for distinguishing them from nonelastic liquids.

The apparatus utilized to measure the elastic drag coefficient of the superelastic guar gum solution prepared as described earlier consisted of an elongated glass cylinder provided with an outer jacket through which water was circulated from a thermostatically controlled vessel in order to maintain a liquid within the cylinder and essentially constant temperature. A steel ball was suspended within the cylinder at the end of a flexible line which passed over a pulley supported at the outer end of a cantilever arm mounted on a stanchion. The line was connected to a drum driven by a motor operated at constant speed. The cantilever arm used to support the pulley was provided with a strain gage which measured the deflection of the arm as the ball was raised within the cylinder. The strain gage signal was fed to a recorder used to produce a plot of the force required to raise the ball through a liquid in the cylinder versus the distance through which the ball traveled.

A drawing illustrating equipment of the type referred to in the preceding paragraph and typical drag coefficient curves obtained with nonelastic liquids and with superelastic liquids may be found in copending application Serial No. 149,049, "Method for Plugging Lost Circulation Zones" filed in the names of Richard E. Walker and Victor V. Horner in the United States Patent Office on October 31, 1961.

The particular apparatus utilized in testing the superelastic guar gum solution referred to above included a half-inch diameter steel ball and a glass column having an internal diameter of 48 millimeters. The test was carried out by filling the column with the superelastic liquid and then lowering the ball into the liquid at the end of the flexible line. The recorder was turned on to provide a record of the force required to move the ball through the liquid. The ball was then pulled upwardly through the column of liquid at a speed of 16 inches per minute. Ignoring initial effects due to the inertia of the ball and terminal effects as the ball emerged from the liquid, the curve obtained showed a series of rupture points between which the force required to move the ball at constant speed decreased to a relatively low level. In each case the curve showed a positive elastic drag coefficient until rupture occurred. Measurement of the slope of the curve at points just before rupture took place showed that the superelastic liquid had an elastic drag coefficient of about 15 grams per inch at the test temperature of 85° F.

The test described was then repeated at a temperature of 116° F. It was found that the elastic drag coefficient of the guar gum solution had decreased from about 15 grams per inch at 85° F. to about 2.6 grams per inch at the 116° F. temperature. The low elastic drag coefficient reflects the fact that the measured slope of the elastic drag curve was low. This indicates that the guar gum solution had lost most of its superelastic properties at the higher temperature. The drag obtained was due largely to the viscosity of the liquid, rather than elasticity. The tensile strength was low at the higher temperature. Such a superelastic liquid would therefore not be satisfactory for high temperature applications where considerable elasticity and high tensile strength are required.

A second test was then carried out using a superelastic liquid prepared from guar gum flour and boric acid as described earlier. The guar gum concentration was the same as in the earlier test but the boric acid was employed in a concentration of 0.130 pound per barrel. This was twice the cross-linking agent concentration used in the earlier test. Measurement of the elastic drag coefficient of this second superelastic liquid gave a value of about 20 grams per inch at 85° F. The higher boric acid concentration resulted in somewhat greater elasticity and tensile strength at 85° F. than were obtained in the earlier case. This same solution was then tested at temperatures of 117° F. and 120° F. It was found that the elastic drag coefficient at 117° F. was about 4 grams per inch and at 120° F. was about 3 grams per inch. The use of the boric acid at twice the concentration employed in the earlier test thus failed to improve the elasticity and tensile strength of the liquid significantly at the elevated temperatures. Moreover, it was found that this second superelastic liquid was not stable at 85° F. in the presence of water containing calcium salts. The salts caused precipitation of the guar gum, apparently because of the high degree of cross-linking between the guar gum molecules. The earlier solution, on the other hand, was stable in the presence of calcium salts. This demonstrates the importance of employing the cross-linking agents in the proper concentrations.

Following the tests described above, a third guar gum solution having superelastic properties was prepared. The guar gum concentration in this third solution was identical to that in the two earlier solutions. Boric acid was added as a cross-linking agent in a concentration of 0.260 pound per barrel. Glycerol was added in a concentration of 0.43 volume percent. No difficulty in cross-linking the guar gum to produce a superelastic liquid was encountered. This material was then tested in the manner described earlier to determine its elastic drag coefficient. At 85° F. it was found that the solution had an elastic drag coefficient of about 18 grams per inch. Despite the use of the cross-linking agent in a much higher concentration, the elasticity and tensile strength of the solution were slightly lower than those of the second solution tested earlier. This indicates that the glycerol retained some of the boric acid cross-linking agent and thus limited the extent to which cross-linking occurred. The addition of calcium salts to the solution at 85° F. did not result in precipitation of the guar gum, showing that the liquid was stable despite the high concentration in which the boric acid was used. The elastic drag coefficient was then measured at a temperature of 108° F. It was found that the coefficient at this temperature was about 11 grams per inch, nearly as high as that of the first solution at 85° F. Subsequent tests were carried out at temperatures of 118° F., 125° F., 130° F. and 141° F. The corresponding elastic drag coefficients at these temperatures were 9 grams per inch, 7 grams per inch, 4½ grams per inch and 1 gram per inch. These results show that the presence of the glycerol in the solution resulted in better elasticity and tensile strength characteristics at 130° F. than were obtained with the second solution at 117° F. It is thus apparent that the sensitivity of the solution to temperature was significantly reduced by addition of the glycerol and excess cross-linking agent.

The stabilizing effect of the polyhydric alcohols on cross-linked polysaccharide solutions is shown by the results obtained with a series of guar gum solutions allowed to stand after they had been prepared. An initial solution was produced by mixing 2.54 pounds of guar flour, 0.1 pound of boric acid, and 0.4 pound of benzoic acid per barrel of tap water. This solution was allowed to hydrate until the viscosity reached 250 centipoises, as measured on the Brookfield viscometer using the number 1 spindle at 12 revolutions per minute. Various alcohols were added to separate portions of the solution and the pH of each portion was adjusted to a value between about 10.1 and about 10.3 by adding a mixture of sodium carbonate and sodium bicarbonate. In each case the result was a thick viscous liquid which clearly possessed superelastic properties. The samples thus prepared were allowed to stand for 24 hours and were then reexamined. The results were as follows:

*Stabilizing effect of alcohols*

| Alcohol | Alcohol Concentration, Volume percent | Condition of Solution After 24 Hours |
| --- | --- | --- |
| None | | Underwent syneresis. |
| Isopropanol | 1.57 | Do. |
| 1,2,3-Trihydroxy-Benzene | 1.57 | Do. |
| 1,3-Butanediol | 1.57 | Do. |
| Glycerol | 0.43 | No apparent change. |
| 1,2-Ethanediol | 1.57 | Do. |
| 1,2-Propanediol | 1.57 | Do. |

The above data show that the sample containing no alcohol was unstable and underwent syneresis during storage. There was a marked separation between the liquid and solid constituents and a complete loss of superelastic properties. The sample containing the monohydric alcohol, that containing the cyclic polyhydric compound, and that containing the alcohol having hydroxyl groups separated by a carbon atom were similarly unstable. The samples containing acyclic polyhydric alcohols having adjacent hydroxyl groups, on the other hand, showed no signs of syneresis and retained their superelastic properties. This clearly shows the stabilizing effect of the alcohols employed in accordance with the invention.

What is claimed is:
1. A process for the preparation of a superelastic liquid which comprises suspending a polysaccharide having adjacent cis hydroxyl groups in an aqueous medium in a concentration between about 0.5 and about 12 lbs. per barrel, reacting the suspended polysaccharide with a sufficient quantity of a cross-linking agent which in aqueous solution yields borate ions to cross-link said polysaccharide and provide excess borate ions, and providing an acyclic $C_2$ to $C_5$ polyhydric alcohol having at least 2 adjacent hydroxyl groups in said aqueous medium in a concentration sufficient to react with said excess borate ions and stabilize the cross-linked polysaccharide.

2. A process as defined by claim 1 wherein said suspended polysaccharide is reacted with said cross-linking agent in the presence of said polyhydric alcohol.

3. A process as defined by claim 1 wherein said polysaccharide is a galactomannan.

4. A process as defined by claim 1 wherein said cross-linking agent is boric acid.

5. A process as defined by claim 1 wherein said polyhydric alcohol is glycerol.

6. A process for the preparation of a superelastic liquid which comprises dispersing a finely-divided galactomannan in an aqueous medium in a concentration between about 0.5 and about 12 lbs. per barrel, allowing said galactomannan to hydrate, reacting said galactomannan with from about 0.1 to about 12 lbs. per barrel of a cross-linking agent which in aqueous solution yields borate ions to cross-link said galactomannan and provide excess borate ions, and adding an acyclic $C_2$ to $C_5$ polyhydric alcohol having at least 2 adjacent hydroxy groups in a concentration sufficient to react with said excess borate ions and stabilize the cross-linked galactomannan.

7. A process as defined by claim 6 wherein said galactomannan is guar gum and said gum is dispersed in said medium in a concentration between about 1.0 and about 3.0 lbs. per barrel.

8. A process as defined by claim 6 wherein said polyhydric alcohol is 1,2-ethanediol.

9. A process as defined by claim 6 wherein said polyhydric alcohol is 1,2-propanediol.

10. A process for the preparation of a superelastic liquid which comprises adding to an aqueous medium a dry mixture containing, per barrel of medium, from about 1 to about 3 lbs. of a polysaccharide having adjacent cis hydroxyl groups, an acid in an amount sufficient to reduce the pH to a value below about 7 and effect hydration of said polysaccharide, from about 0.1 to about 0.4 lb. of an acyclic $C_2$ to $C_5$ polyhydric alcohol having at least 2 adjacent hydroxyl groups, and from about 0.08 to about 0.8 lb. of a cross-linking agent which in aqueous solution yields borate ions, said cross-linking agent providing borate ions in excess of the quantity required for cross-linking said polysaccharide and said alcohol being present in a concentration sufficient to react with the excess borate ions, permitting said polysaccharide to hydrate in said aqueous medium; and thereafter adjusting the pH of said aqueous medium to effect cross-linking of said polysaccharide by said cross-linking agent.

11. A process for the preparation of a superelastic liquid which comprises hydrating guar gum in an aqueous medium in a concentration of from about 1.0 to about 3.0 pounds per barrel of said medium to form a colloidal solution, adding a borate cross-linking agent to said medium in a concentration of from about 0.05 to about 0.4 pound per barrel, the concentration of said cross-linking agent being sufficient to provide excess borate ions after said guar gum is cross-linked, adjusting the pH of said medium to effect cross-linking of said guar gum by said cross-linking agent, and incorporating an acyclic $C_2$ to $C_5$ polyhydric alcohol having at least 2 adjacent hydroxyl groups in said medium in a concentration of from about 0.1 to about 1.0 gallon per barrel to react with said excess borate ions and stabilize said medium.

12. A process as defined by claim 11 wherein said alcohol is glycerol.

13. An aqueous superelastic liquid containing a polysaccharide having adjacent cis hydroxyl groups in a concentration of from about 0.5 to about 12 lbs. per barrel, a borate ion cross-linking agent present in a concentration sufficient to cross-link said polysaccharide and provide excess borate ions, and an acyclic $C_2$ to $C_5$ polyhydric alcohol having at least 2 adjacent hydroxyl groups per molecule, said polyhydric alcohol being present in a concentration sufficient to react with said excess borate ions and stabilize the cross-linked polysaccharide.

14. An aqueous liquid of high viscosity containing from about 0.5 to about 12 lbs. per barrel of a suspended galactomannan, from about 0.1 to about 12 lbs. per barrel of a water-soluble inorganic compound which yields borate ions in aqueous solution, said compound being present in a concentration sufficient to cross-link said galactomannan and providing excess borate ions, and from about 0.1 to about 2.0 gallons per barrel of an acyclic $C_2$ to $C_5$ polyhydric alcohol having at least 2 adjacent hydroxyl groups per molecule, said polyhydric alcohol being present in a concentration sufficient to react with said excess borate ions and stabilize the cross-linked galactomannan.

15. An aqueous superelastic liquid containing from about 1.0 to about 3.0 pounds per barrel of a polysaccharide having adjacent cis hydroxyl groups, from about 0.06 to about 0.8 pound per barrel of a water-soluble inorganic compound which yields borate ions in aqueous solution, said compound being present in a concentration sufficient to cross-link said polysaccharide and provide excess borate ions, and from about 0.1 to about 2.0 gallons of an acyclic $C_2$ to $C_5$ polyhydric alcohol having at least 2 adjacent hydroxyl groups per molecule, said alcohol being present in a concentration sufficient to react with said excess borate ions and stabilize the cross-linked polysaccharide.

16. An aqueous superelastic liquid containing from about 1.0 to about 3.0 pounds of guar gum per barrel, from about 0.06 to about 0.8 pound of boric acid per barrel, said boric acid being present in a concentration sufficient to cross-link said guar gum and provide excess borate ions, and from about 0.1 to about 1.0 gallon of glycerol per barrel, said glycerol being present in a concentration sufficient to react with said excess borate ions and stabilize the cross-linked guar gum.

References Cited by the Examiner
UNITED STATES PATENTS

| | | | |
|---|---|---|---|
| 2,949,439 | 8/60 | Fuchsman et al. | 260—462 |
| 3,000,790 | 9/61 | Jeanes et al. | 252—8.5 |
| 3,058,909 | 10/62 | Kern | 252—8.55 |
| 3,067,192 | 12/62 | Emrick | 260—234 |
| 3,079,332 | 2/63 | Wyant | 252—8.5 |
| 3,096,284 | 7/63 | Slate | 252—8.55 |

OTHER REFERENCES

Deuel et al.: Article in Die Makromolekulare Chemie, vol. 3, 1949, pages 13 to 21.

JULIUS GREENWALD, *Primary Examiner.*

UNITED STATES PATENT OFFICE
CERTIFICATE OF CORRECTION

Patent No. 3,215,634                            November 2, 1965

Richard E. Walker

It is hereby certified that error appears in the above numbered patent requiring correction and that the said Letters Patent should read as corrected below.

In the grant, lines 2 and 3, for "assignor to Jersey Production Research Company, a corporation of Delaware," read -- assignor, by mesne assignments, to Esso Production Research Company, of Houston, Texas, a corporation of Delaware, --; line 12, for "Jersey Production Research Company" read -- Esso Production Research Company --; in the heading to the printed specification, lines 3 and 4, for "assignor to Jersey Production Research Company, a corporation of Delaware" read -- assignor, by mesne assignments, to Esso Production Research Company, Houston, Tex., a corporation of Delaware --.

Signed and sealed this 7th day of March 1967.

(SEAL)
Attest:

ERNEST W. SWIDER                            EDWARD J. BRENNER
Attesting Officer                           Commissioner of Patents